United States Patent [19]

Sellstrom et al.

[11] Patent Number: 4,605,688

[45] Date of Patent: Aug. 12, 1986

[54] METHOD FOR MAKING SYNTACTIC FOAM WITH IMPROVED PROCESSING CHARACTERISTICS USING A SILANE COUPLING AGENT IN COMBINATION WITH AN AMINATED ALKYLPHENOL ALKOXYLATE

[75] Inventors: Kathy B. Sellstrom; Harold G. Waddill, both of Austin, Tex.

[73] Assignee: Texaco Inc., White Plains, N.Y.

[21] Appl. No.: 808,694

[22] Filed: Dec. 13, 1985

[51] Int. Cl.⁴ ............................................. C08J 9/32
[52] U.S. Cl. ....................................... 523/218; 521/54; 521/178; 523/219
[58] Field of Search .................... 523/218, 219; 521/54

[56] References Cited

U.S. PATENT DOCUMENTS

| | | | |
|---|---|---|---|
| 2,806,509 | 9/1957 | Bozzacco et al. | 521/54 |
| 2,978,340 | 4/1961 | Veatch et al. | 521/54 |
| 3,477,967 | 11/1969 | Resnick | 523/219 |
| 3,541,194 | 11/1970 | Resnick | 523/219 |
| 3,769,126 | 10/1973 | Kolek | 428/372 |
| 3,888,812 | 6/1975 | Plettner | 523/426 |
| 3,945,964 | 3/1976 | Hastings et al. | 523/414 |
| 4,158,714 | 6/1979 | Brichta et al. | 428/392 |

FOREIGN PATENT DOCUMENTS

| | | |
|---|---|---|
| 4,412,012 | 10/1983 | Bouley et al. ............ 523/218 |
| 4,492,732 | 1/1985 | Murphy et al. ........... 523/219 |
| 4,528,305 | 7/1985 | Henry ....................... 523/219 |
| 976,680 | 10/1975 | Canada . |
| 2,213,051 | 10/1972 | Germany . |
| 7,384,838 | 11/1973 | Japan . |

OTHER PUBLICATIONS

Fleming & Barlow, "Syntactic Foam for Use on HSM Program, " Univ. of Calif., L. Livermore Laboratory, (MEL80-001500) 3/19/80.

Plueddemann and Stark, "Surface Modification of Fillers and Reinforcement in Plastics," 32nd Annual Tech Conf., 1977, Soc. Plastics Industry.

Lee and Neville, "Handbook of Epoxy Resins," 1967, Chapter 10, pp. 4–5.

May and Tanaka, "Epoxy Resins, Chemistry and Technology," Marcel Dekker, Inc. (NY) 1973, pp. 566–577.

*Primary Examiner*—Morton Foelak
*Attorney, Agent, or Firm*—Jack H. Park; Kenneth R. Priem

[57] ABSTRACT

Syntactic foam with improved processing characteristics is disclosed wherein a blend of aminosilane and aminated alkylphenol alkoxylates are used to improve processability and reduce cure time of the syntactic foam system.

5 Claims, No Drawings

METHOD FOR MAKING SYNTACTIC FOAM WITH IMPROVED PROCESSING CHARACTERISTICS USING A SILANE COUPLING AGENT IN COMBINATION WITH AN AMINATED ALKYLPHENOL ALKOXYLATE

RELATED APPLICATIONS

This application is related to attorney Ser. No. 808,718, filed of even date.

BACKGROUND OF THE INVENTION

1. Field of the Invention

The invention relates to methods for preparing syntactic foams.

2. Description of Related Publications

A paper entitled "Surface Modification of Fillers and Reinforcement in Plastics," by E. P. Plueddemann and G. L. Stark, 32nd Annual Technical Conference (1977), Reinforced Plastics/Composites Institute, The Soc. of Plastics Ind., Inc. (1977), discusses silane modification of mineral surfaces used primarily to improve adhesion and water resistance in various plastics, including epoxy resins. Silane coupling agents are discussed, including aminosilanes.

U.S. Pat. Nos. 3,541,194 and 3,477,967 to Resnick disclose methods for making syntactic foams using various silane coupling agents.

U.S. Pat. No. 3,769,126 to Kolek discloses a low density resinous filament wound composite having fiberglass filaments and hollow glass microspheres whose surfaces are treated with a viscosity and bond improving agent such as a silane having an amino group.

U.S. Pat. No. 4,158,714 to Brichta, et al. discloses a method for imparting adhesion between reinforcing materials and a plastic matrix wherein at least one silane coupling agent is used, including an aminosilane.

The *Handbook of Epoxy Resins*, by Lee and Neville, 1967, McGraw-Hill, discusses the use of nonylphenol as an accelerator in epoxy resin systems, at Chapter 10, pages 4 and 5.

Canadian Pat. No. 976,680 also discusses epoxy resins using as an accelerator nonylphenol.

U.S. Pat. No. 3,888,812 to Plettner discloses a process of manufacturing aqueous emulsions of epoxy resins using an ethylene oxide adduct of nonylphenol.

German Offen. No. 2,213,051 discloses an aqueous epoxy resin emulsion with alkylphenol emulsifiers.

Also, Japan. Kokai No. 73 84,838 discloses a water thinned epoxy resin coating composition containing polyethylene glycol nonylphenyl ether.

*Epoxy Resins*, Chemistry and Technology, edited by May and Tanaka (1973), Marcel Dekker, pp. 566–577, discusses syntactic foams.

Syntactic foams are materials utilized for their buoyancy comprising hollow spheres which can be of glass encased in a plastic resin matrix which can be a cured epoxy resin.

SUMMARY OF THE INVENTION

The invention is a syntactic foam comprising a vicinal polyepoxide having an epoxy equivalency of greater than about 1.8, a hollow granular filler, a curing amount of a curing agent for the polyepoxide, an effective amount of an aminated alkylphenol alkoxylate and an effective amount of a silane coupling agent. The invention is also a method for preparing a syntactic foam by mixing the above ingredients in effective amounts.

DESCRIPTION OF THE PREFERRED EMBODIMENTS

Adequate mixing of a highly filled glass reinforced epoxy system is difficult unless some type of surface modifier is present in the system. Even when surface modifiers are included, the cure time of the filled system may be quite long. It is known that adding silane coupling agents to an epoxy binder system, or that using silane treated glass as the filler, will enhance the processibility of highly filled systems. That is, the ease of mixing the filler and the epoxy binder system will be enhanced. However, long cure times may still be a problem. In this invention, blends of a silane coupling agent and aminated alkylphenol alkoxylates were used to improve processibility and to reduce cure time of syntactic foam systems.

Generally, the vicinal polyepoxides are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; i.e., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e. isopropylidene bisphenol, novolac, resorcinol, etc. The epoxy derivatives of methylene or isopropylidene bisphenols are especially preferred. In general, suitable polyepoxides have a viscosity low enough to allow mixing of adequate amounts of hollow filler material into a homogeneous mass without excessive shearing which might cause breakage of the filler.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylene bisphenol, 2,4'-dihydroxydiphenylethylmethane, 3,3'-dihydroxydiphenyldiethylmethane, 3,4'-dihydroxydiphenylmethylpropylmethane, 2,3-dihydroxydiphenylethylphenylmethane, 4,4'-dihydroxydiphenlypropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds are resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers; e.g. polyethylene glycols, polypropylene glycols, triglycerol, dipentaerythritol and the like, polyallyl alcohol, polyhydric thioethers such as 2,2'-,3,3'-tetrahydroxydipropylsulfide and the like, mercapto alcohols such as monothioglycerol, dithioglycerol, and the like, polyhydric alcohol, partial esters, such as monostearin, pentaerythritol monoacetate, and the like, and halogenated polyhydric alcohols such as the monochlorohydrins of glycerol, sorbitol, pentaerythritol and the like.

It will be appreciated by those skilled in the art that the polyepoxide compositions which are useful according to the practice of the present invention are not limited to those containing the above described polyepoxides, but that these polyepoxides are to be considered merely as being representative of suitable polyepoxides.

The amine curing agents which can be utilized in accordance with the instant invention are generally any of those amine curing agents which are well known to be useful for the curing of vicinal epoxies. Generally, those curing agents having at least two reactive primary amine groups are useful.

Exemplary of those amines which can be utilized are alkylene polyamines such as diethylene triamine, triethylene tetramine and the like; oxyalkylene polyamines such as polyoxypropylene, di-and triamine and diamino derivatives of ethylene glycol, such as 1,13-diamino-4,7,10-trioxatridecane.

Although aromatic amine curing agents such as the alkylenelinked polyphenyl amines, phenylene diamines and dpolycyclic or fused aromatic primary amine compounds are not recommended because they generally require excessively high curing temperature, the corresponding cycloaliphatic compounds are probably useful.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

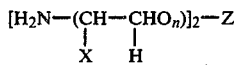

wherein X is hydrogen, a methyl radical or an ethyl radical; Z is a hydrocarbon radical having 2 to 5 carbon atoms forming from 2 to 4 external ether linkages; n is a number from 2.6 to about 33. The most preferred polyoxyalkylene polyamines are the polyoxypropyl diamines wherein X is a methyl radical, n is a number from 2.6 to 5.6, and Z is a 1,2-propylene radical. These polyoxyalkylene polyamines can be prepared by known methods as disclosed in U.S. Pat. Nos. 3,236,895 and 3,654,370. A preferred polyoxyalkylene polyamine is a polyoxypropylene diamine having a molecular weight of about 230.

Another preferred polyoxyalkylene polyamine has the following structure:

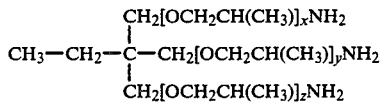

An essential ingredient in a syntactic foam is a hollow granular filler. For example, these may be in the form of hollow glass grains with average particle density not over 0.45, wall thickness approximately 1.8 microns, and 20 to 29 microns outside diameter. The particular specifications just given for the hollow glass fillers are not to be construed as limitative of this invention. It is not essential that the hollow granular filler fit within the specifications just given. Those skilled in the art will recognize other fillers which will be equally useful.

For example, other useful fillers include nitrogen filled phenolic hollow grains. The hollow grains can also be made from ceramic, beryllium oxide, epoxy resin, copper, silver and polyvinylidene chloride. These grains may range in size from microscopic to the size of BB shot.

In accordance with the present invention, the use of aminated alkylphenol alkoxylates in combination with silane coupling agents will result in improved processibility of highly filled glass reinforced epoxy systems (syntactic foams) while resulting in the reduced cure time for these systems. Cure time for systems containing the additive blend of this invention are considerably shorter than those for systems containing either of the additives added separately as the following data will show. Also, there is little if any additional heat buildup inside the epoxy foam because of the accelerated cure. Therefore, expansion of the material is minimized. Since less dense materials have lower compressive strength, the additive blend of our invention results in an improved syntactic foam.

Aminated alkylphenol alkoxylates, preferably aminated nonylphenol ethoxylates, are useful in the present invention. Other aminated alkylphenol alkoxylates useful in the present invention include those derived from, for example, P-octylphenol, nonylphenol, dodecylphenol and dinonylphenol. Useful alkoxylates for the above alkylphenols include, for example, propoxylates and ethoxylates.

The degree of alkoxylation is, for example, about 1 to 50 moles of ethylene oxide or propylene oxide per mole of nonylphenol. It is especially preferred to use ethoxylates of alkylphenol, especially ethoxylates of nonylphenol.

The nonylphenol ethoxylates useful in this invention are amine terminated. In general, nonylphenol ethoxylates are capped with propylene oxide and these capped materials are aminated by techniques known to those skilled in the art. It is desirable that the hydroxyl groups in the nonylphenol ethoxylates be secondary groups for ease of amination. Normally, the amination step does not completely replace all of the hydroxyl groups. However, the majority of hydroxyl groups are replaced by amine groups. The degree of amination may range from about 90% to as low as about 60% to obtain useful product. The nonylphenol ethoxylates which have been capped with a secondary hydroxyl group are typically reacted with ammonia over a nickel-copper-chromium catalyst at about 200° C. and about 2000 psig. For example, U.S. Pat. No. 3,654,370 describes an acceptable reductive amination process which is incorporated herein by reference.

Silane couping agents useful in the present invention include amino silanes, chloro silanes, epoxy silanes, isocyanato silanes, ureido silanes and methacryloxy silanes. Others may be found to be useful by those skilled in the art.

The following examples will demonstrate the improvement of the combination of aminated alkylphenol alkoxylates in combination with silane coupling agents in epoxy based syntactic foams. As can be seen from the results in Table II, where the combination of additives is used, the time to peak temperature is reduced and the density of the product is not affected to a great extent.

EXAMPLE 1

Syntactic foams were prepared by combining the epoxy resin(s) and curing agent, adding surfactant/coupling agent and/or other additives, and combining the liquid binder systems with the preweighed glass microballoons. The foam systems were mixed with a paint shaker to avoid shattering the hollow glass spheres. The mixed foams were packed into 4×4×4-inch wooden molds. Several foam formulations are presented in Table I.

TABLE I

| Formulation, pbw | A | B | C | D | E |
|---|---|---|---|---|---|
| EPON ® 828[1] | 95 | 95 | 95 | 95 | 95 |
| HELOXY ® WC-8[2] | 5 | 5 | 5 | 5 | 5 |
| JEFFAMINE ® D-230[3] | 31.3 | 31.3 | 31.3 | 31.3 | 31.3 |
| Aminosilane[4] | 0.4 | — | 0.4 | 0.4 | 0.4 |
| SURFONAMINE ® MNPA-510[5] | — | — | — | — | 0.4 |
| SURFONAMINE ® MNPA-750[6] | — | — | — | 0.4 | — |
| SURFONAMINE ® MNPA-860[7] | — | 0.4 | 0.4 | — | — |
| Glass microballoons[8] | 41.6 | 41.6 | 41.6 | 41.6 | 41.6 |
| Volume % glass | 60 | 60 | 60 | 60 | 60 |
| Ease of mixing | \multicolumn{5}{c}{Good} | | | | |

TABLE I-continued

| Formulation, pbw | A | B | C | D | E |
|---|---|---|---|---|---|
| Ease of mixing | | | Good | | |

[1] Liquid epoxy resin (EEW 188); a product of Shell Chemical Co.
[2] Glycidyl ether of $C_{12}$-$C_{14}$ alcohol; a product of Wilmington Chemical Co.
[3] 230 molecular weight polyoxypropylenediamine; a product of Texaco Chemical Co.
[4] 3-aminopropyltriethoxy silane; a product of Petarch.
[5] Aminated nonylphenol ethoxylate (4.0 moles of EO); a product of Texaco Chemical Co.
[6] Aminated nonylphenol ethoxylate (9.5 moles of EO); a product of Texaco Chemical Co.
[7] Aminated nonylphenol ethoxylate (12.0 moles of EO); a product of Texaco Chemical Co.
[8] B23/500 glass microspheres; a product of 3M Company.

EXAMPLE 2

Properties for the formulations shown in Table I (from Example 1) are given in Table II.

TABLE II

| Formulation, pbw | A | B | C | D | E |
|---|---|---|---|---|---|
| Peak temperature, °C. | 134.5 | 125.1 | 130.7 | 141.5 | 133.8 |
| Time to peak temp., min. | 248 | 297 | 153 | 162 | 168 |
| Density, g/cc | 0.47 | 0.46 | 0.45 | 0.43 | 0.43 |
| Compressive strength, psi | 2900 | 2400 | 2600 | 2400 | 2300 |

We claim:

1. In a method for making syntactic foams with improved processability and lower cure times, including combining a vicinal ployepoxide having an epoxy equivalency of greater than 1.8, a hollow granular filler and a curing amount of a curing agent for the polyepoxide, the improvement which comprises:
combining with the above ingredients an effective amount of an aminated alkylphenol alkoxylate and an effective amount of an aminosilane coupling agent. An alkylphenol alkoxylate and a silane coupling agent.

2. A method as in claim 1 wherein the aminated alkylphenol alkoxylate is derived from an ethoxylate of nonylphenol.

3. A method as in claim 2 wherein the ethoxylate of nonylphenol is a 4.0 mole ethylene oxide aduct of nonylphenol.

4. A method as in claim 2 wherein the ethoxylate of nonylphenol is a 9.5 mole ethylene oxide adduct of nonylphenol.

5. A method as in claim 2 wherein the ethoxylate of nonylphenol is a 12.0 mole ethylene oxide adduct of nonylphenol.

* * * * *